Feb. 9, 1943.     P. DE MICHELIS     2,310,220
PROPULSION MECHANISM
Filed Jan. 21, 1939
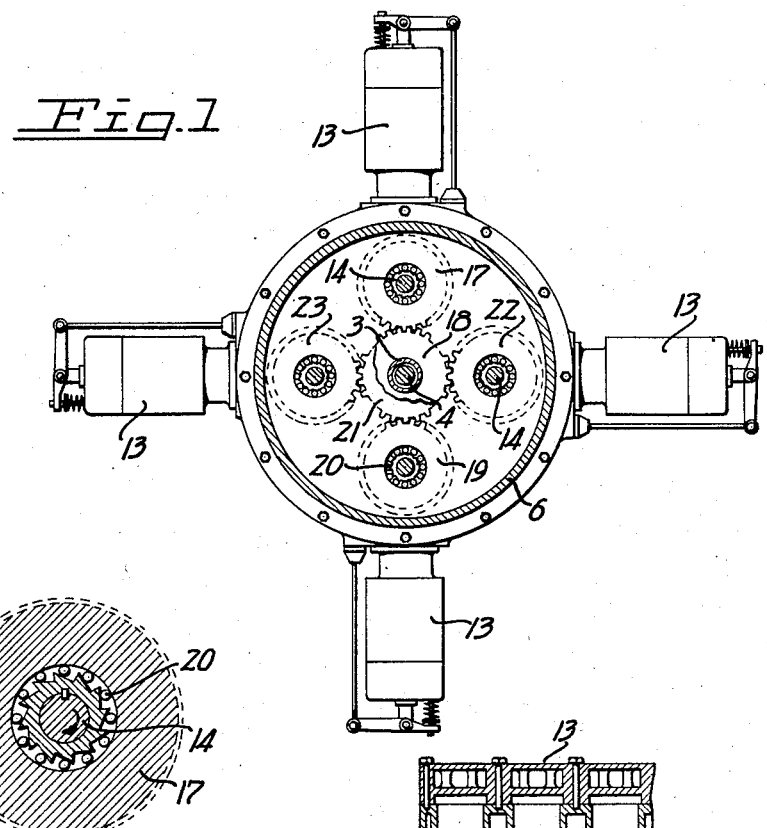
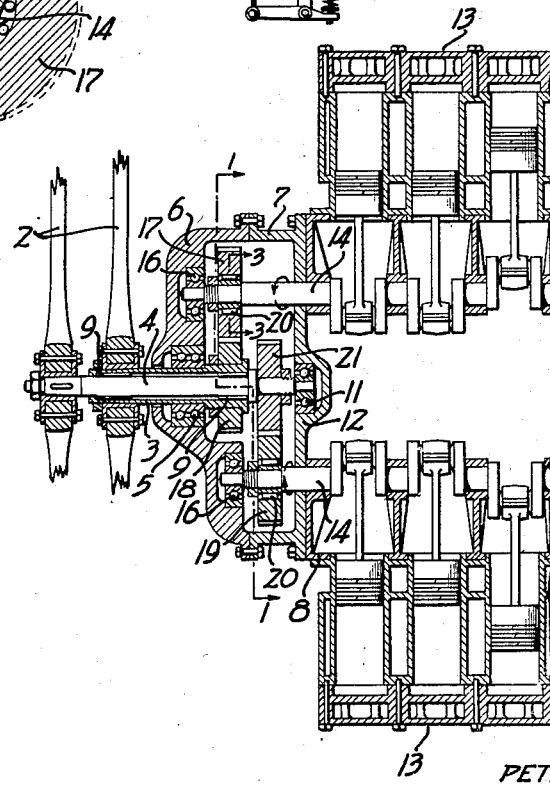
INVENTOR
PETER DE MICHELIS
BY Charles S. Evans
HIS ATTORNEY Patented Feb. 9, 1943

2,310,220

UNITED STATES PATENT OFFICE 2,310,220

PROPULSION MECHANISM

Peter De Michelis, San Francisco, Calif., assignor of one-half to Peter J. Feykert, San Francisco, Calif.

Application January 21, 1939, Serial No. 252,155

1 Claim. (Cl. 170—135.5)

My invention relates to mechanism for driving the propellers of vehicles, such as aircraft.

It is among the objects of my invention to provide a propulsion mechanism embodying a plurality of propellers and motors for driving the same, whereby at least one of the propellers continues to function even though a motor fails.

Another object is to provide means for disconnecting a propeller from its motor in event the latter fails, so that the inactive motor does not put a drag on the propeller.

Another object is to provide an improved arrangement of motor units for driving a plurality of coaxial propellers.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claim.

Referring to the drawing:

Figure 1 is a transverse vertical sectional view of a propulsion mechanism for an airplane embodying the improvements of my invention, taken in a plane indicated by line 1—1 of Figure 2; and Figure 2 is a fragmentary longitudinal sectional view taken through the propeller axis, showing the drive connection between the propellers and two of the motor units.

Figure 3 is a detail sectional view showing one of the one-way clutches, taken in a plane indicated by line 3—3 of Figure 2.

My invention relates primarily to improvements in aircraft for promoting greater safety in flying. In an ordinary airplane having a single propeller the failure of a motor is often fatal. In my construction a plurality of multiple motored propellers are provided, all mounted about a common axis. This improved propulsion mechanism provides a factor of safety in event one motor should fail; and the coaxial arrangement of the propellers provides a compact propulsion unit adapted for small as well as large craft. Another improvement in my construction is the elimination of the drag of a dead motor on a propeller. This is accomplished by means for disconnecting a motor from the propeller, should the motor fail.

In terms of broad inclusion, the propulsion mechanism of my invention comprises a motor for driving a propeller, and means for disconnecting the motor from the propeller in event the motor should fail. The disconnecting means preferably comprises a one-way clutch interposed in the drive connection. A plurality of coaxial propellers are preferably provided, and a plurality of motors are preferably arranged to drive the propellers so that one motor continues to drive at least one propeller should another motor fail.

In greater detail, and referring to Figures 1 to 3 of the drawing, my propulsion mechanism as applied to an airplane comprises a pair of coaxial propellers 2 mounted on the forward ends of a hollow shaft 3 and a center shaft 4 projecting through the hollow shaft. The outer shaft or sleeve 3 is journaled in a bearing 5 mounted in the nose plate 6 of the housing 7, the latter being bolted directly to the crank case 8 of the motor assembly. Center shaft 4 is journaled in the hollow shaft in spaced needle bearings 9, and the tail end of the center shaft is journaled in a bearing 11 mounted on a base plate 12 of the housing.

The propellers are independently driven by a plurality of motors 13. These motor units may be of any suitable type and arrangement. For purposes of compactness and symmetry of design I prefer to employ a series of in-line motors mounted radially about the axis of the propellers. By an in-line motor I mean one having a series of cylinders arranged in a straight line. The number of cylinders in each of these individual motor units will depend upon the horse power to be developed.

Crank shafts 14 of the in-line motors are thus disposed circumferentially about the propeller axis, and each crank shaft projects into the housing 7 and is journaled in a suitable bearing 16 mounted in nose plate 6. One of the motors is drivably connected to one propeller by a gear 17 on the crank shaft meshed with a gear 18 on the hollow shaft, and another motor is connected to the other propeller by a gear 19 on the crank shaft meshed with a gear 21 on the center shaft 4. The other two motor units shown in Figure 1 are also connected to each of the propellers by gears 22 and 23 meshed with gears 18 and 21, respectively. In other words, each propeller has two separate driving motors.

While I have shown four motors, it is understood that more may be provided; thus, six motors could be disposed about the propeller axis, three of them having crank shaft gears meshed with gear 18 and the other three having gears meshed with gear 21. Or, two motors could be provided, each connected with one of the propellers as shown in Figure 2. A distinct advantage of my improved airplane is that at least one propeller keeps going even through one or more of the motors fail. As long as one motor continues to function, there is sufficient driving thrust to give the pilot control of the ship.

The propellers 2 are preferably of opposite pitch and are preferably driven in opposite directions. With the gear arrangement shown, the crank shafts connected to gear 18 turn oppositely from those connected with gear 21. If the motors are designed to run in the same direction, the reverse rotation may be achieved by interposed idler gears. I have found that coaxial propellers rotating in opposite directions are considerably more efficient because they avoid detrimental influences such as cavitational effects accompanying propellers running in the same direction. I also preferably pitch the back face of the trailing propeller so that the air thrust from the leading propeller assists the trailing propeller in its rotation, as described in my Patent No. 2,064,195, issued December 15, 1936.

While I have shown a plurality of propellers, it is understood that a single propeller may be provided and driven by a plurality of motors so that if one motor fails another still functions to drive the propeller. Figure 1 shows two motors for driving each propeller, and therefore illustrates the multiple motoring of an individual propeller.

If a motor should fail the compression of the dead motor would put a drag on the connected propeller. Where only one motor is connected to each propeller such a failure of a motor tends to stall one of the propellers and place a severe drag on the forward movement of the ship, because the propeller is converted into an impeller tending to run the motor. When more than one motor is provided for each propeller, the compression of a dead motor puts an additional load on the companion motor. It is therefore highly desirable to disconnect a motor upon failure of the latter. This is preferably accomplished by interposing an overrunning or one-way clutch 20 in the drive connection between a propeller and each of its connected motors.

As shown in Figures 2 and 3, the one-way clutches 20 are preferably interposed between the crank shafts and the gears mounted thereon, thus Figure 3 shows the clutch between crank shaft 14 and gear 17. The one-way clutches may be of any suitable construction, such as roller clutches operating on the wedge principle. The clutches are arranged to transmit driving thrust from the crank shafts to the gears, but to permit a gear to freely overrun its crank shaft should a motor fail.

The provision of a one-way clutch in the drive means for a propeller is a very important feature of my invention, and may be employed in ordinary single propeller craft to reduce the drag on the ship should the motor fail. Also, in larger ships having a plurality of spaced propulsion units, a one-way clutch in each unit likewise reduces the drag of a dead motor and makes the active units more effective.

I claim:

In combination, a pair of coaxial propellers, four in-line motors circumferentially disposed and equally spaced about the propeller axis, each motor having a shaft, said shafts being circumferentially disposed and equally spaced about said axis, a drive gear on each shaft, a driven gear connected with one of the propellers and meshed with a pair of said drive gears, a driven gear connected with the other propeller and meshed with another pair of the drive gears, and a wedging-roller one-way clutch interposed between each drive gear and its shaft.

PETER DE MICHELIS.